United States Patent
Zehnder

(10) Patent No.: US 6,235,662 B1
(45) Date of Patent: May 22, 2001

(54) FLEXIBLE WATER-RESISTANT COMPOSITES

(76) Inventor: Wolfgang Zehnder, Schmiedweg 10, 85551 Kirchheim (DE)

(*) Notice: Subject to any disclaimer, the term of this patent is extended or adjusted under 35 U.S.C. 154(b) by 0 days.

(21) Appl. No.: 09/194,005
(22) PCT Filed: Jun. 25, 1997
(86) PCT No.: PCT/EP97/03339
§ 371 Date: Nov. 16, 1998
§ 102(e) Date: Nov. 16, 1998
(87) PCT Pub. No.: WO97/49553
PCT Pub. Date: Dec. 31, 1997

(30) Foreign Application Priority Data

Jun. 25, 1996 (DE) .................................. 196 25 389

(51) Int. Cl.⁷ ............................ B32B 27/08; A41D 31/02
(52) U.S. Cl. .................. 442/223; 428/315.9; 428/316.6; 442/224; 442/372; 442/373
(58) Field of Search ................... 442/372, 373, 442/223, 224; 428/315.9, 316.6

(56) References Cited

U.S. PATENT DOCUMENTS

| | | | |
|---|---|---|---|
| 3,352,511 | * | 10/1994 | Abayasekara et al. . |
| 3,953,566 | * | 4/1976 | Gore . |
| 4,194,041 | * | 3/1980 | Gore et al. . |
| 4,862,730 | * | 9/1989 | Crosby . |
| 4,943,475 | * | 7/1990 | Baker et al. ......................... 428/246 |
| 4,969,998 | * | 11/1990 | Henn ..................... 210/490 |
| 5,209,850 | * | 5/1993 | Abayasekara . |
| 5,308,689 | * | 5/1994 | Shinkai . |
| 5,354,587 | * | 10/1994 | Abaysekara . |
| 5,439,733 | * | 8/1995 | Paire ................................... 428/219 |
| 5,529,830 | * | 6/1996 | Dutta et al. ......................... 428/176 |
| 5,543,465 | * | 8/1996 | Bell et al. ............................ 525/182 |
| 5,650,225 | * | 7/1997 | Dutta et al. ....................... 428/318.4 |

FOREIGN PATENT DOCUMENTS

| | | | |
|---|---|---|---|
| 29 25318 C2 | | 6/1978 | (DE) . |
| 42 43955 A1 | * | 12/1992 | (DE) . |
| 0615779 A1 | * | 9/1994 | (DE) . |
| 0 160 473 | | 11/1985 | (EP) . |
| 0 227 384 | * | 7/1987 | (EP) . |
| WO 95/26881 | * | 10/1995 | (WO) . |
| WO 95/32093 | * | 11/1995 | (WO) . |

* cited by examiner

*Primary Examiner*—Blaine Copenheaver
(74) *Attorney, Agent, or Firm*—Carol A. Lewis White

(57) ABSTRACT

This invention provides air impermeable liquid-water resistant water vapor-permeable composites with enhanced water-vapor-permeable properties comprising: (a) a layer of a microporous polymer that is water-vapor permeable and which is liquid water-resistant in contact with (b) an air-impermeable, liquid water resistant, polymer layer that is permeable to water-vapor molecules, and (c) a third layer of a microporous, water vapor permeable, hydrophilic polymer present on the side of the air impermeable polymer layer opposite the microporous polymer (a).

9 Claims, No Drawings

FLEXIBLE WATER-RESISTANT COMPOSITES

FIELD OF THE INVENTION

The invention relates to flexible laminate composites which are especially suited for use for water resistant, but water vapor permeable textile materials, or apparel made from the materials.

BACKGROUND OF THE INVENTION

Materials for use for rainwear are known which have a layer of expanded microporous polytetrafluoroethylene (ePTFE) or porous polypropylene, see for example, Gore, et al., U.S. Pat. No. 4,194,041 or Henn, U.S. Pat. No. 4,969,998. Expanded microporous water-repellent polytetrafluoroethylene material described in Gore, U.S. Pat. No. 3,953,566 is especially well suited for this purpose. It is liquid water repelling, but allows water vapor, in the form of perspiration, to pass through. Polyurethanes and other polymers have been used for this purpose also. To confer good flexibility on the materials for use in the textile sector, the microporous layer should be made as thin as possible. However, a thinner membrane will generally mean a loss of performance, and thin coatings run the risk of decreasing water repellency.

U.S. Pat. No. 4,194,041 describes the use of an additional coating on microporous polymers which is based on a thin, air-impermeable coating composed of a polyetherpolyurethane or polyperfluorosulfonic acid that transports water vapor molecules by diffusion. The thin coating is employed to reduce transmission of surface active agents and contaminating substances through the polymers. Owing to the chemical structure of the polymer, the monolithic coating on the microporous structure exhibits a high transport of water molecules, (high permeability to water vapor) through the polymers material. This film should be applied as thinly as possible in order not to affect the flexibility, yet confer adequate protection on the composite. Furthermore, water vapor permeability deteriorates greatly in the case of thicker, monoithic films.

A type of composite membrane is known from U.S. Pat. No. 4,969,998. In this membrane the material of the inner layer has in part penetrated into the pores of the microporous outer layer. As the material for the microporous outer layer, microporous expanded polytetrafluoroethylene, is proposed. As for the inner layer a polyether-polythioether is proposed. The latter material up to a certain degree fills the pores of the microporcus layer, but is consistently tight, amorphous and nonporous. It is reported that this composite has moisture vapor transmission rates which are higher than the moisture vapor transmission rates of the laminate described first. However, when the composite was used as a textile laminate for rainwear it was found that under extreme athletic load and the associated heavy formation of perspiration, the latter cannot always be dissipated to the environment without residue. The liquid perspiration remaining on the inside of the clothing adversely affects the feeling of well-being and comfort of wearing.

SUMMARY OF THE INVENTION

It is a purpose of this invention to provide flexible liquid water resistant, water vapor permeable composites having a enhanced moisture vapor transmission rate.

The composite is:

(a) a layer of a microporous polymer that is water-vapor permeable and liquid water-resistant, said layer adhered to (b) an air-impermeable polymer layer that is water-vapor permeable, wherein said layer (b) has adhered on the side opposite layer (a)

(c) a layer of a microporous polymer that is water-vapor permeable and hydrophilic.

The microporous polymer has voids throughout the internal structure which form an interconnected continuous air path from one side to another.

It has been found that when the composite containing layer (c) is used in a garment and this layer is innermost, the moisture vapor transmission rate is unexpectedly greater from the inside to the outside than the moisture vapor transmission rate of one of other three-layer composites, not containing a hydrophilic layer. This occurrence, which is surprising, may possibly be attributed to the fact that the moisture vapor transmission rate of the middle layer (b) increases in excess proportion when liquid water is present on the boundary surface. It may be that the microporous inner layer which has hydrophilic properties acts like a type of sponge and absorbs the perspiration which forms and distributes it over larger surface areas so that the individual water molecules on the boundary layer to the inner diffusion layer pass easily or in higher concentration into solution and thus migrate or diffuse more quickly to the outer side.

Microporous layer (c) can either be inherently hydrophilic or be rendered hydrophilic using known processes, for example using the process as is described in U.S. Pat. No. 5,209,850. Processes for rendering microporous polymers hydrophilic are described in two U.S. Pat. Nos. 5,352,511 and 5,354,587. DE-A 4243955 is also concerned with rendering initially water-repellent layers of fluoropolymers hydrophilic. Other treatment procedures are described below.

In a preferred aspect the microporous polymer layers are exemplified by a porous, expanded polytetrafluoroethylene (ePTFE) film.

DETAILED DESCRIPTION OF THE INVENTION

Definitions

By "flexible" is meant easily bent, i.e., pliable.

By "liquid water resistant" is meant that the material is waterproof at a water pressure of 13.8 kN/M$^2$.

By "microporous" is meant a material has very small, microscopic voids throughout the internal structure which forms an interconnected continuous air path from one surface to the other.

By "air-impermeable" is meant that no airflow is observed for at least two minutes as determined by the Gurley test described below.

By "water vapor permeable" is meant an MVTR or at least 1000 g/m$^2$ per 24 hr, preferably 2000 g/m$^2$ per 24 hr.

By "hydrophilic" material is meant a porous material whose pores become filled with liquid water when subjected to liquid water without the application of pressure.

By "adhered" is meant layer to layer surface contact or impregnation, fully or partially, of layer (b) into the pores of layer (a), as well as adherence by use of an adhesive.

Suitable microporous polymers for layers (a) and (c) herein include fluoropolymers, e.g. polytetrafluoroethylene or polyvinylidene fluorides, polyolefins, e.g. polyethylene or polypropylene; polyamides; polyesters; polysulfone, poly (ethersulfone) and combinations thereof, polycarbonate, polyurethanes. To achieve flexibility, the layers should be thin.

If the microporous polymer of layer (c) is not naturally hydrophilic, it can be rendered hydrophilic by treating it. Materials that can be used to treat the microporous polymer to make it hydrophilic include: aqueous, alcoholic or aqueous/alcoholic solutions of a copolymer of tetrafluoroethylene and vinylacetate, polyacrylic acid and copolymers thereof, polyacrylamide and copolymers thereof, polyvinyl acetate (PVA), polystyrenesulfonate; polyethylene-, or propylene glycols (PEG, PPG), hydrophilic silicones; anionic, cationic, nonionic or amphoteric surface active agents or mixtures, and complexes of the above.

Treatment with hydrophilic material is accomplished by applying a liquid form of the material, e.g., a melt, or solution or latex dispersion of the material, as, e.g. by dipping, painting, spraying, roller-coating or brushing the liquid on the surface. Application is carried out until internal surfaces of the microporous structure are coated, but not until the pores are filled as that would destroy or severely lessen the water-vapor transmitting property of the layer. Thus, the presence of the hydrophilic material has little effect on the porosity; that is, the walls defining the voids in the microporous polymer preferably have only a very thin coating of the material. Application of the material can be achieved by varying the concentration, solids content of the solution or dispersion, and/or by varying the application temperature, or pressure.

The air-impermeable polymer layer (b) is combined with the polymer layers (a) and (c) by any one of several methods. The air-impermeable polymer can be applied in liquid form from a liquid mixture or can be applied in solid sheet form. If the polymer is in sheet form, it can be laminated to the oleophobic membrane by passing the sheets through nip rolls or using a breathable adhesive. A convenient polymer for layer (b) is a water-vapor permeable air-impermeable polyurethane, such as Hypol® 2000 (W. R. Grace & Co.). It can be applied pre-crosslinked or can be crosslinked after application. Microporous layer (c) can be pretreated to render it hydrophilic. This can be done before layer (b) is affixed or after.

In one method to produce the triple-ply composite, the pre-crosslinked polyurethane resin with curing agent is applied to a first film of ePTFE by means of a roll coater. The coating weight can, for example, be 10 g/m². Then another microporous ePTFE layer is applied and the layers joined in this way are routed through a gap between the two pressure rolls so that not yet completely crosslinked resin is pressed to a certain degree into the microporous structure and penetrates into the pores. The polyurethane resin can however be adhered as a finished film to one of the layers first, as is described, for example in DE-PS2925318. Then one layer (layer (c)) of microporous film is rendered hydrophilic by treatment described above.

The layer thicknesses, densities and pore sizes of the ePTFE layers used can vary, depending on the application.

The composites of the invention can be laminated to fabrics on one or both sides and the resulting material used to make waterproof but water-vapor permeable garments.

The composite can be used in conjunction with rainwear and athletic clothing. Of course the composite can also be used in other industrial applications, where it can be used to remove molecules of low molecular weight from solutions, in distillation, sewage concentration, concentration of juices or biological systems or also in dialysis applications. The prerequisites for this application are the selective diffusion behavior of the middle layer which must have higher solubility for the passing molecules than for the other molecules of the mixture to be concentrated.

The composite is also advantageous in that presence of pin holes, etc., does not lead to leaks. Water penetrating via a hole on the inside, i.e., the side facing the body of the wearer, will first form a drop. This drop, however, will again be transported into this inner layer by capillary forces and transported to the middle layer (b). On this surface, the water is distributed over the surface and is "transferred" as vapor from there to the outside.

TEST PROCEDURES

Air Permeability/Impermeability—Gurley Number Test
Gurley numbers were obtained as follows:
The resistance of samples to air flow was measured by a Gurley densometer (ASTM) D726–58) manufactured by W. & L. E. Gurley & Sons. The results are reported in terms of Gurley Number which is the time in seconds for 100 cubic centimeters of air to pass through 6.54 cm² of a test sample at a pressure drop of 1.215 kN/m² of water. A material is air-impermeable if no air passage is observed over 120 second interval.

Moisture Vapor Transmission Rate Test (MVTR)
In this procedure, approximately 70 ml of a solution consisting of 35 parts by weight of potassium acetate and 15 parts by weight of distilled water was placed into a 133 ml polypropylene cup, having an inside diameter of 6.5 cm at its mount. An expanded polytetrafluoroethylene (PTFE) film having a minimum MVTR of approximately 60,000 g/m² per 24 hours as tested by the method described in U.S. Pat. No. 4,862,730 to Crosby using potassium acetate and available from W. L. Gore & Associates, Inc. of Newark, Del. was heat sealed to the lip of the cup to create a taut, leakproof, microporous barrier containing the solution. The water bath assembly was controlled at 23° C., plus or minus 0.2° C., utilizing a temperature controlled roll and a water circulating bath. The sample to be tested was allowed to condition at a temperature of 23° C. and a relative humidity of 50% prior to performing the test procedure. Samples were placed so the microporous polymeric film to be tested was in contact with the surface of the water bath and an equilibration of at least 15 minutes was used for laminates with textiles and at least 10 minutes for film composites, prior to the introduction of the cup assembly. The cup assembly was weighed to the nearest 1/1000 g and was placed in an inverted manner onto the center of the test sample. Water transport was provided by the driving force between the water in the water bath and the saturated salt solution providing water flux by diffusion in that direction. The sample was tested for 15 minutes and the cup assembly was then removed and weighed again. The MVTR is calculated from the weight gain of the cup assembly and expressed in gm of water per square meter of sample surface area per 24 hours.

EXAMPLE 1

A composite was prepared by laminating together two expanded microporous polytetrafluoroethylene (PTFE) films provided by W. L. Gore & Associates, Inc. The two PTFE films had a nominal pore size of 0.25 μm, a weight of about 20 g/m² and a thickness of 40 μm. For lamination a water-vapor-permeable (breathable) polyurethane (PUR) prepolymer of MDI and an alkylene oxide described in U.S. Pat. No. 4,942,214 was applied and partially penetrated into the microporous structure of the first film using a roll coating device, then the second film was laminated using the PUR as the adhesive between two nip rolls. After moisture curing of the PUR at room temperature, the above mentioned laminated film was coated on one side with the polymer solution described in U.S. Pat. No. 5,209,850 to render the microporous PTFE hydrophilic (laydown=4 g/m²). After drying, the resulting composite turned clear on one side after immersion in water.

The moisture vapor transmission rate for this composite was measured by first facing the untreated side, then the hydrophilic side of the membrane towards the water.

MVTR measured shows 28,000 g/m² per 24 hr for the untreated side and 75,000 g/m² 24 hr for the hydrophilic side facing the water.

EXAMPLE 2

The composite of example 1, before applying the hydrophilic coating, was laminated on one side to a 120 g/m² polyester textile using a spot wise adhesion process. After this process, the side not laminated to the textile was hydrophilic PUR coated using the polymer described in U.S. Pat. No. 5,209,850 to render it hydrophilic (laydown=4 g/m²).

MVTR measured shows 7,600 g/m² per 24 hr for textile side facing the water and 23,000 g/m² per 24 hr for the hydrophilic film side facing the water.

EXAMPLE 3

A composite was prepared like in Example 1, except that for the hydrophilic treatment, a commercially available antifogging spray (Nigrin Anti Fogging Spray, Inter-Union Technohandel Landau) was applied on one side. MVTR measured shows 28,000 g/m² per 24 hr for the untreated and 79,000 g/m² per 24 hr for the hydrophilic side facing the water.

What is claimed is:

1. A flexible, liquid water resistant, water-vapor-permeable composite comprised of:
   (a) a layer of a microporous polymer film that is water vapor permeable and liquid water resistant, said layer adhered to;
   (b) an air-impermeable polymer layer that is water vapor permeable, wherein said layer (b) has adhered on the side opposite layer (a),
   (c) a layer of a microporous polymer film that is water vapor permeable, and hydrophilic.

2. The composite of claim 1 laminated to a textile layer on one or both sides.

3. The composite of claim 1 wherein the membrane of layer (a) is expanded polytetraflouroethylene.

4. The composite of claim 3 laminated to a textile layer on one or both sides.

5. The composite of claim 3 wherein layer (b) is a polyurethane and layer (c) is expanded polytetraflouroethylene that has been made hydrophilic.

6. The composite of claim 5 laminated to a textile layer on one or both sides.

7. Apparel including the composite of claim 1.

8. Process for providing a composite which comprises:
   a) providing a microporous polymer film that is water vapor permeable and liquid water resistant;
   b) providing an air-impermeable polymer that is water vapor permeable;
   c) providing a microporous polymer film that is water vapor permeable and hydrophilic; and
   d) adhering the polymers together to form a laminate of the three wherein polymer (b) is sandwiched between polymer (a) and polymer (c).

9. Process for providing a composite which comprises:
   a) providing a microporous polymer film that is water vapor permeable and liquid water resistant;
   b) providing an air-impermeable polymer that is water vapor permeable;
   c) providing a microporous polymer film that is water vapor permeable and treating it with a hydrophilic material; and
   d) adhering the polymers together to form a laminate of the three wherein polymer (b) is sandwiched between polymer (a) and polymer (c).

* * * * *